US011050768B1

(12) United States Patent
Stickle et al.

(10) Patent No.: US 11,050,768 B1
(45) Date of Patent: Jun. 29, 2021

(54) DETECTING COMPUTE RESOURCE ANOMALIES IN A GROUP OF COMPUTING RESOURCES

(71) Applicant: Amazon Technologies, Inc., Seattle, WA (US)

(72) Inventors: Thomas Charles Stickle, Saint James, NY (US); Justin Smith, Ashburn, VA (US)

(73) Assignee: Amazon Technologies, Inc., Seattle, WA (US)

( * ) Notice: Subject to any disclaimer, the term of this patent is extended or adjusted under 35 U.S.C. 154(b) by 388 days.

(21) Appl. No.: 15/272,023

(22) Filed: Sep. 21, 2016

(51) Int. Cl.
*H04L 29/06* (2006.01)

(52) U.S. Cl.
CPC ...... *H04L 63/1425* (2013.01); *H04L 63/1416* (2013.01); *H04L 63/1441* (2013.01)

(58) Field of Classification Search
CPC ....... G06F 21/00; G06F 21/55; H04L 41/064; H04L 41/065; H04L 12/185; H04L 63/1425; H04L 63/1441; H04L 63/1416
USPC ......................................................... 726/23
See application file for complete search history.

(56) References Cited

U.S. PATENT DOCUMENTS

| | | | |
|---|---|---|---|
| 6,529,784 B1 * | 3/2003 | Cantos | G06F 11/2294 700/79 |
| 7,376,969 B1 * | 5/2008 | Njemanze | G06F 21/55 709/224 |
| 7,945,658 B1 * | 5/2011 | Nucci | H04L 41/065 370/238 |
| 9,106,687 B1 * | 8/2015 | Sawhney | H04L 12/185 |
| 10,135,850 B2 * | 11/2018 | Brew | G06F 16/38 |
| 2004/0205374 A1 * | 10/2004 | Poletto | H04L 41/064 714/4.2 |
| 2006/0136585 A1 * | 6/2006 | Mayfield | G06F 7/14 709/224 |
| 2009/0094697 A1 * | 4/2009 | Provos | H04L 63/145 726/23 |
| 2010/0229124 A1 * | 9/2010 | Green | G06F 16/64 715/828 |
| 2012/0137367 A1 * | 5/2012 | Dupont | G06F 21/00 726/25 |
| 2016/0028645 A1 * | 1/2016 | Hohn | H04L 41/0654 709/224 |
| 2016/0261482 A1 * | 9/2016 | Mixer | H04L 43/12 |

\* cited by examiner

*Primary Examiner* — Bryan F Wright
(74) *Attorney, Agent, or Firm* — Nicholson De Vos Webster & Elliott LLP (57) ABSTRACT

A computing anomaly detection technique includes identifying a plurality of compute resources that are susceptible to compute resource anomalies. A group of similar compute resources from the plurality of compute resources may be determined. A difference in one or more of a plurality of attributes of the compute resources of the group may be determined. An anomaly detection notification, containing a compute resource anomaly, may be output.

20 Claims, 9 Drawing Sheets

DETECTING COMPUTE RESOURCE ANOMALIES IN A GROUP OF COMPUTING RESOURCES

BACKGROUND

Some computing systems offer centralized, virtual computing options known as service provider environments which may be used to reduce overall costs, improve availability, improve scalability, and reduce time to deploy new applications and computing architectures. For example, some computing systems may act as a service that provides virtual computing, virtual storage, virtual networking and other virtual services as purchased for variable use periods or on a pay-per-use basis (e.g., pay for a certain amount of API (application program interface) transactions or bandwidth) from large pools of re-purposable, multi-tenant computing resources or services.

Virtualization technologies for computing services have provided benefits with respect to managing large-scale computing resources for many customers with diverse needs, allowing various computing resources to be efficiently and securely shared by multiple customers. For example, virtualization technologies may allow one or more physical computing machine to be shared among multiple users by providing each user with one or more virtual machines hosted by the one or more physical computing machine, with each such virtual machine being a software simulation acting as a distinct logical computing system.

The security of computing resources and associated data is of high importance in many contexts, including virtualized computing. An organization, for example, may support its operations using both internal networks of computing resources and computing resources managed by others. Computers of the organization, for instance, may communicate with computers of other organizations to access and/or provide data while using services of another organization. With many complex uses of computing resources to manage, ensuring that access to the computing devices and/or data are authorized and generally that the computing devices and/or data are secure can be challenging, especially as the size and complexity of such configurations grow. Specifically, such computing systems are regularly subject to malware, advanced persistent threats (APT), and other similar attacks.

SUMMARY OF INVENTION

A technology is described for detecting and reporting anomalies in a service provider environment.

DETAILED DESCRIPTION

A technology is described for detecting and reporting anomalies in a service provider environment. An anomaly service operating in the service provider environment may identify computing resources that are susceptible to compute resource anomalies. The anomaly service may determine groups of similar resources from the plurality of compute resources that share a set of attributes. For example, a group of compute resources that have an attribute identifying the same load balancer, and an attribute identifying the same machine image, may be determined to be a group selected from the various compute resources of a large and complex service provider environment. Groups may be determined by a function of distance (i.e., measure of similarity) between two compute resources and a linkage criterion (e.g., quality of collective similarity) for a set of compute resources.

An anomaly in one or more compute resources of the determined group may be identified by the anomaly service by determining a difference in one or more of a plurality of attributes of one or more compute resources as compared to the attributes of the compute resources in the group. In another example, an anomaly may be identified by determining a difference in one or more of the plurality of attributes of one or more compute resources relative to baseline attribute values for the compute resources in the group. In yet another example, an anomaly may be identified by determining a difference in one or more of the plurality of attributes of one or more compute resources relative to expected attribute values for the computer resources in the group.

An indication of the anomaly of the group of compute resources may be provided to one or more additional compute resources such as an intrusion detection system and the anomaly may represent a possible intrusion into a customer's portion of a service provider environment. The anomaly indication may list each compute resource or computing instance determined to have a difference in one or more of the plurality of attribute values and/or differing one or more attributes, and each host that the listed compute resources and/or computing instances are running on. Accordingly, the indication of an anomaly may be provided to a customer or owner of the compute resource(s). This reporting may enable a customer or administrator to make changes to the compute resource and/or remediate the potential intrusion.

In an alternative configuration, the anomaly service may shut down the compute resource and restart another compute resource to take the place of the terminated compute resource. For example, if a virtualized proxy server is identified as having attribute values that do not match the attributes of other peer proxy server, then the proxy server can be shut down by a customer or by the anomaly service and a new instance of the may be started and added to the group of compute resources. The proxy server may also be rebooted if it is believed that a reboot will address the anomaly. Thus, the problem compute resource may be addressed quickly and without impacting the customers overall workload.

Figure 1:
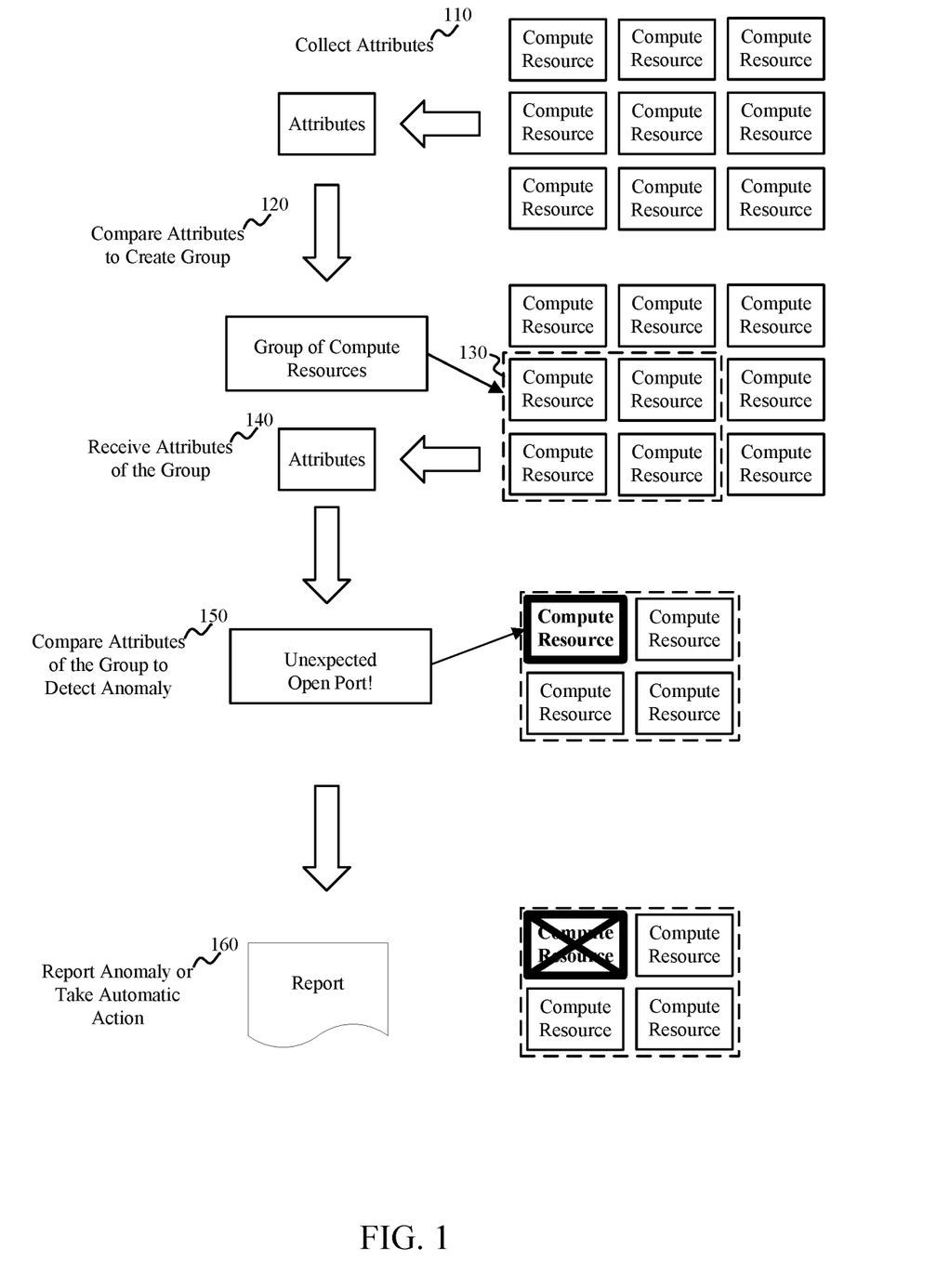
FIG. 1 is an illustration of determining a group of compute resources and determining computing anomalies in the group according to an example of the present technology.

FIG. 1 illustrates an example of determining a group of compute resources and determining computing anomalies in the group according to an example of the present technology. To determine a group of compute resources in a group, attributes for a plurality of compute resources may be collected 110. Although there are numerous attributes of the compute resources, some are more relevant for determining which compute resources belong together in a group. For example, computer resources that are coupled to the same load balancer, are member of the same automatically scaled computer resource, from the same machine image, and have the same security configurations are likely form a group of related compute resources. The collected attributes may therefore indicate whether a certain compute resource is a specific type of load balancer or the attributes may indicate the load balancer that a compute resource is coupled to. The attributes may also indicate the machine image that a compute resource was activated from. The attributes may include metadata from a service provider environment, compute resources determined from the metadata, and/or attributes information provided from a compute resource via a service agent. The collected attributes may be compared 120 to determine a set of the plurality of compute resources that belong to a group. For example, by comparing the attributes an anomaly service may determine which compute resources are behind a particular load balancer, which compute resources were also activated from a common machine language, and other shared or related attributes of compute resources. A group 130 may therefore be created from the set of compute resources that share or have related attributes.

To determine a computing anomaly, attributes for the compute resources within the group may be received 140. An anomaly may be detected from one or more differences in the received attribute for the group of compute resources 150. For example, one of the received attributes may indicate that an unexpected port has been opened on a compute resource in the group. The anomaly may be reported or an automatic option may be taken to automatically correct or mitigate the detected anomaly 160.

Figure 2:
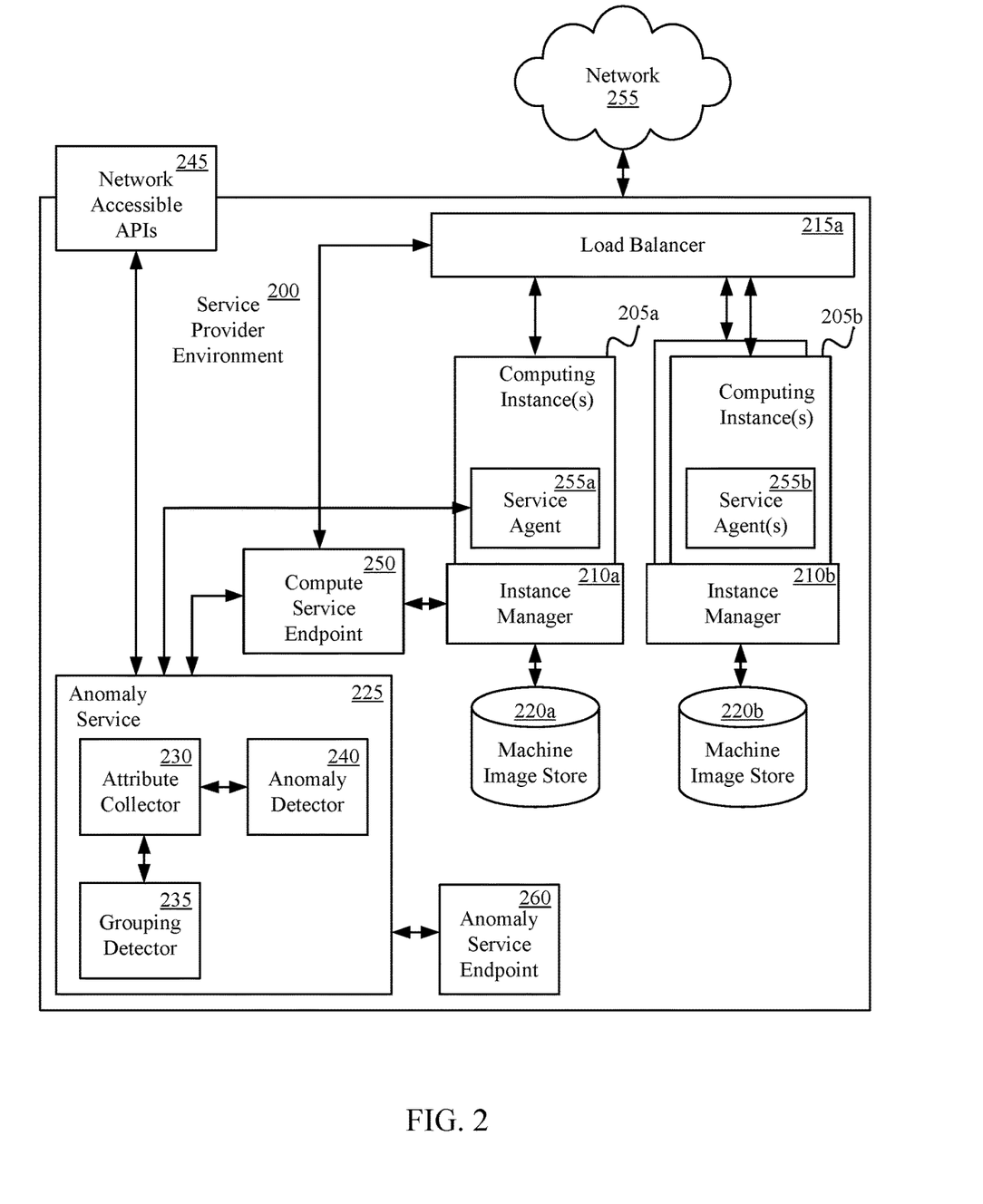
FIG. 2 is a block diagram illustrating an example service provider environment that may be used to execute and manage a number of compute resources on which the present technology may execute.

FIG. 2 illustrates an example service provider environment that may be used to execute and manage a number of compute resources on which the present technology may execute. In particular, the service provider environment 200 illustrates another environment in which the technology described herein may be used. The service provider environment 200 may be one type of environment that includes various virtualization service resources that may be used, for instance, to host any number and types of compute resources. The compute resources may include infrastructure, platform and/or application services including compute service, storage service, content delivery, networking service, data store services, databases, analytics, applications, deployment, management, mobile, developer tools, internet of things tools, and any other similar service.

In one aspect, the service provider environment 200 may include a plurality of computing instances 205a-b, one or more instance managers 210a-b and one or more load balancers 215a-b. The service provider environment 200 may provide one or more instance managers 210a-b capable of invoking and managing the computing instances 205a-b. The instance managers 210a-b may be hypervisor, virtual machine monitor (VMM), or another type of program configured to enable the execution of multiple computing instances 205a-b on one or more servers. Additionally, each of the computing instances 205a-b may be configured to execute one or more applications. Different computing instances 205a-b may embody different software stacks (e.g., combinations of operating systems and applications). The one or more instance managers 210a-b may provide automatic scaling whereby the amount of computational resources in a group in the service provider environment 200 scales automatically based on the load on the service provider environment 200. The one or more load balancers 215a-b can route incoming traffic to computing instance or other compute resources based on either application level information, network level information, or based on advanced application level information that analyzes the content of the request.

The one or more instance managers 210a-b may invoke computing instances 205a-b from one or more machine images or configuration management processes. Various machine images may be stored in one or more machine image stores 220a-b. The virtual machine image (also virtual appliance, software appliance, virtual machine platform) may be used by the instance manager to create a virtual machine within a service provider environment. The virtual machine image serves as the basic unit of deployment that can include an operating system and any additional software to deliver a service or a portion of it. The virtual machine image contains a software stack designed to run on a virtual machine platform. The instance manager in combination with the virtual machine image provides for installation, configuration and maintenance of the one or more software stacks.

In one aspect, the service provider environment 200 may provide an anomaly service 225. In a more specific example, the anomaly service 225 may include an attribute collector 230, a grouping detector 235, and an anomaly detector 240. The anomaly service 225 may also be communicatively coupled to one or more network accessible Application Programming Interfaces (API) 245, one or more compute service endpoints 250 one or more service agents 255, and a service endpoint 260.

In one aspect, the attribute collector 230 may collect attributes of a plurality of compute resources and/or computing instances of the service provider environment 200. The attributes may be collected on a group basis for compute resources. For example, the attribute collector 230 may receive metadata for the service provider environment 200 from the one or more network accessible APIs 245 and/or the one or more compute service endpoints 250. The one or more network accessible APIs 245 may provide various metadata from the control plane of the service provider environment 200 regarding compute resources of the service provider environment and attributes of the compute resources. The one or more compute service endpoints 250 may provide various metadata from the data plane of the service provider environment 200 regarding compute resources of the service provider environment and attributes of the compute resources. In addition, the attribute collector 230 may receive attributes from one or more of the service agents 255a, 255b in respective computing instances. The service agents 255a, 255b may run in a computing instance and determine various configuration attributes from the data plane of the computing instance.

In one aspect, the grouping detector 235 may determine groups of compute resources and/or computing instances that share a set of attributes. For example, a group of compute resources that share a set of attributes may include one or more of a plurality of compute resources (e.g., electronic page services, data store servers, analytics servers, etc.) behind a load balancer, a plurality of automatically scaled compute resources, a plurality of compute resources activated from a common machine image, and/or a plurality of compute resources activated from a common configuration management operation. Groups may be determined by a function of distance (i.e., measure of similarity or distance function) between two compute resources and a linkage criterion (e.g., quality or measure of collective similarity) for a set of compute resources. The distance, for any two items X and Y, may be specified as a function. According to the function, similar items have small distance and dissimilar items have large distances. A variation of a Hamming distance which counts how many attributes are different and returns the count as the distance may be used. In addition, the function may weight those attributes whose similarities are more or less important for determining the distance. The linkage criterion expands the distance represented by the function to indicate for a given set of items (>2) what is their collective distance. The linkage criterion may use Unweighted Pair Group Method and Arithmetic Mean (UPGMA) which takes the average distance between the pairs of items within the set. For example, a service provider environment may include hosts {V, W, X, Y, Z}. A distance metric can indicate whether X is more similar to Y or more similar to Z (e.g. $f(X,Y)<f(X,Z)$ ?). Whereas the linkage criterion can indicate whether X would be more appropriately clustered with {W, Y} or with {V, Z}. Once the distance and linkage criterion functions are defined, each pair of items can be compared and a distance computed.

In one aspect, the grouping detector 235 may determine a group of compute resources that share a set of attributes. The attributes used to determine the group may be selected based upon likelihood that the attribute indicates that the compute resource are member of the same group. Attributes such as configuration parameters, event parameters, execution parameters and execution patterns tend to be relevant to determining a grouping. For example, relevant attributes may include attributes that indicate an automatic scaling group, a machine image, and/or a security configuration. In a more detailed aspect, the grouping detector 235 may weigh attributes based on a relevancy of the attributes in determining a group. For example, attributes identifying a load balancer, a machine image and a security configuration may be prioritized over an attribute representing an Internet Protocol (IP) address used in determining compute resources that belong to the same group. In another example, an indication or value representing that compute resources are coupled to the same load balancer may be multiplied by a first weight value (e.g., 2) representing that such attribute is a good indicator that the compute resources belong to the same group, while the value representing that compute resources are coupled to the same port may be multiplied by a second weight value (e.g., 1) indicating that such attribute may or may not indicate that the compute resources belong to the same group, and the value that compute resources have the same MAC address are multiplied by a third weight value (e.g., 0) representing that such attribute is a poor indicator that the compute resources belong to the same group. The grouping detector 235 may then determine the group of compute resources that share the set of attributes based in part on the weighted attributes.

In one configuration, the attribute collector 230 may store the attributes of the computing resources in the group as a baseline. The attributes may include parameters selected from one or more configuration parameters, event parameters, execution parameters, and other similar parameters.

The anomaly detector 240 may determine a difference in one or more attribute values of compute resources and/or computing instances in the determined group. In one example, the difference in attributes values may include comparing a corresponding attribute between one compute resource or computing instance and other compute resources or computing instances in the group. Similarly, the existence or lack of existence of attributes between a compute resource or computing instance and other compute resources or computing instances in the group may be compared. In another example, the difference between attribute values can include determining a difference between baseline values and current values of one or more of the plurality of attributes of the compute resources and/or computing instances in the group. In another example, the difference in attribute values may include determining a difference between expected values and current values of one or more of the plurality of attributes of the compute resource or computing instance of the group to identify an anomaly in the current values. For example, it may be expected that particular compute resources have a particular open port. The expected value of the open port may be presumed instead of actually determined. Thus, the attribute value for the open port of computer resources in the group may be compared to the presumed open port number.

The anomaly detector 240 may output an indication of a detected anomaly. In one example, the service endpoint 250 may send a notification service message to one or more subscribed services. The message may include attribute values and other applicable findings or reports for the detected anomaly. In one example, a finding or report may be generated that includes a list of compute resource or computing instance determined to have a difference in one or more of the plurality of attribute values and/or differing attributes. In one example, the anomaly indication may trigger an intrusion detection system process that make take remediation action for a compute resource that has been identified as having an anomaly. In another example the anomaly indication can be output when a difference between one or more of the plurality of attributes or attribute values of the compute resources of the group exceeds a predetermined threshold. The service endpoint 250 may also be used by a customer or administrator to monitor the anomaly service 225.

Although the anomaly service 225 is illustrated separately from the compute instances 205a, 205b, it is appreciated that the anomaly detector 240 can be executing within a computing instance. The anomaly service 225 may be executing within a separate compute instance or within one or more compute instances that the anomaly service 225 is monitoring.

The network topology illustrated in FIG. 2 has been simplified. Many more networks and networking device may be utilized to interconnect the various computing systems disclosed herein.

Figure 3:
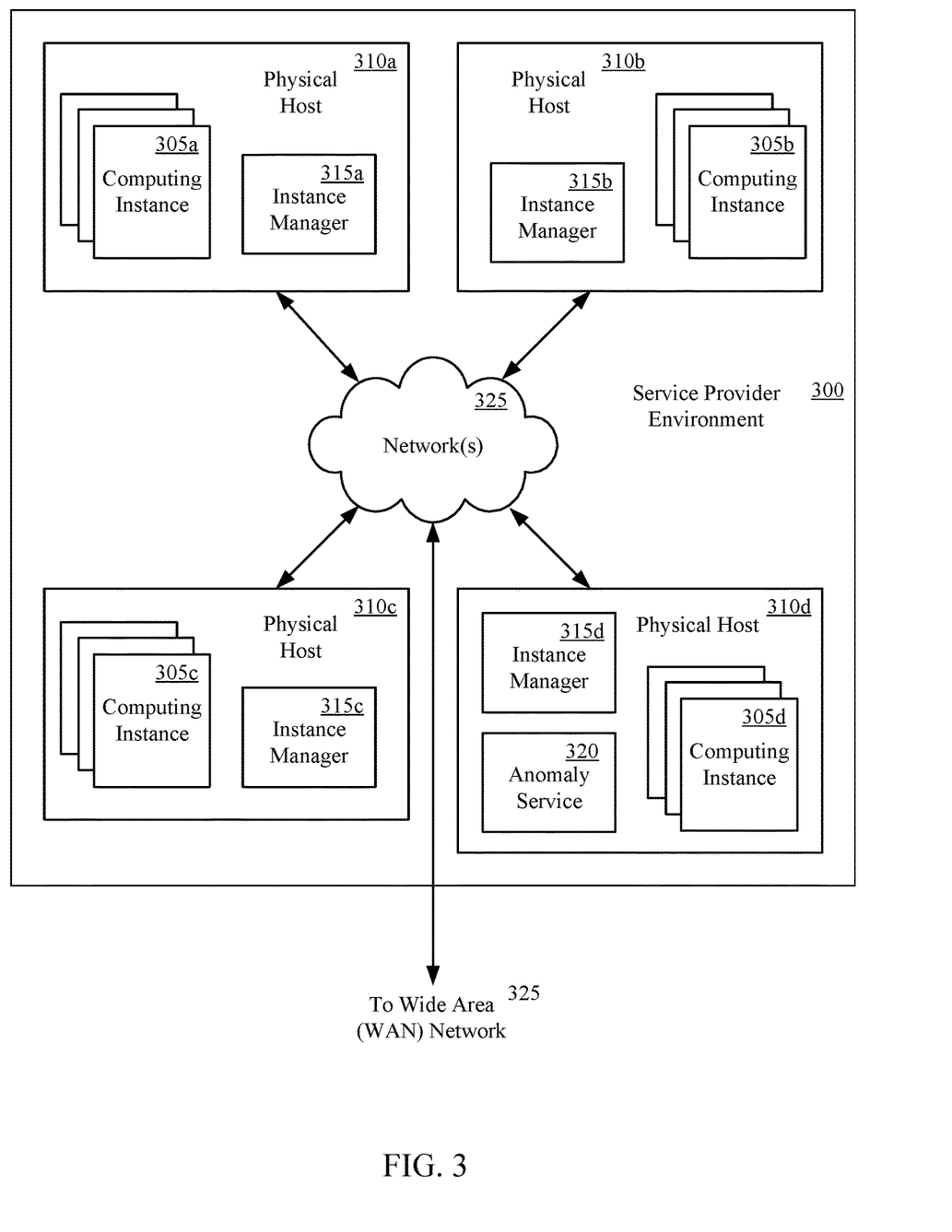
FIG. 3 is a block diagram illustrating another example service provider environment that may be used to execute and manage a number of compute resources on which the present technology may execute.

FIG. 3 illustrates another example service provider environment that may be used to execute and manage a number of compute resources on which the present technology may execute. In particular, the service provide environment 300 illustrates one environment 300 in which the technology described herein may be used. The service provider environment 300 may be one type of environment that includes various virtualization service resources that may be used, for instance, to host computing instances 305a-c.

The service provider environment 300 may be capable of delivery of computing, storage and networking capability as a software service to a community of end recipients. In one example, the service provider environment 300 may be established for an organization by on behalf of the organization. That is, the service provider environment 300 may offer a "private cloud environment." In another example, the service provider environment 300 may support a multi-tenant environment, wherein a plurality of customers may operate independently (e.g., a public cloud environment). Generally speaking, the service provider environment 300 may provide the following models: Infrastructure as a Service (IaaS), Platform as a Service (PaaS), and/or Software as a Service (SaaS). Other models may be provided. For the IaaS model, the service provider environment 300 may offer computers as physical or virtual machines and other resources. The virtual machines may be run as guests by a hypervisor, as described further below. The PaaS module delivers a computing platform that may include an operating system, programming language execution environment, database, and web server.

Application developers may develop and run their software solutions on a computing service platform provided by the service provider environment 300 without incurring the cost of buying and managing the underlying hardware and software. The SaaS model allows installation and operation of application software in the service provider environment 300. End customers may access the service provider environment 300 using networked client devices, such as desktop computers, laptops, tablets, smartphone, etc. running web browsers or other lightweight client applications, for example. Those familiar with the art will recognize that the service provider environment 300 may be described as a "cloud" environment.

The particularly illustrated service provider environment may include a plurality of physical hosts 310a-d. While four physical hosts are show, any number may be used, and large data centers may include thousands of physical hosts. A physical host 310a-d may include one or more computing devices, such as server computers.

The service provider environment 300 may provide compute resources for executing computing instances 305a-c on one or more physical hosts 310a-d. Computing instances 305a-c may, for example be virtual machines. A virtual machine may be an instance of a software implementation of a machine (i.e., computer) that executes applications like a physical machine. In the example of a virtual machine, one or more of the physical hosts 310a-d may be configured to execute an instance manager 315a-c capable of invoking and managing the instances. The instance manager 315a-c may be a hypervisor, virtual machine monitor (VMM), or another type of program configured to enable the execution of multiple computing instances 305a-c on a single server. Additionally, each of the computing instances 305a-c may be configured to execute one or more applications.

One or more networks 325, 330 may be utilized to interconnect the service provide environment 310 and physical hosts 310a-d. The networks 325, 330 may include one or more Local Area Networks (LAN), and may be connected to one or more Wide Area Networks (WAN) 330 or the Internet, so that end customers may access the service provider environment 310. Again the service provider environment topology illustrated in FIG. 3 has been simplified. Many more computing instances may be utilized to implement various computing systems.

A physical host 310d may execute an anomaly service 320 configured to identify a plurality of compute resources that are susceptible to compute resource anomalies. In one aspect, the anomaly service 320 may determine groups of similar compute resources from the plurality of compute resources that are susceptible to anomalies. The anomaly service 320 may determine compute resources in the service provider environment, and attributes of the compute resources, using metadata from the service provider environment. In one instance, the anomaly service may determine that a group includes compute resources with the same machine image lineage. The anomaly service may determine that the group includes computing instances that are from one or more of the same automatically scaled groups. Automatic scaling may refer to the addition of similar or replicated compute resources, such as computing instances, to a computing group and the addition of compute resources is dependent on compute resources existing in the group reaching a defined threshold for work load. Thus, if the computing instances in a group (e.g., a group of web servers) reach 90% capacity, then an additional computing instance may be launched and added to the group. Such automatic scaling may also operate to decrease a size of a group. In another example, the anomaly service may determine that compute resources behind one or more of the same load balancer may be in the group. Similarly, the anomaly service may determine that compute resources that share a security group configuration may be in the same group. In contrast, the anomaly service may determine that compute resources and/or computing instances are in the same group, even though the compute resources and/or computing instances have different MAC addresses, port numbers, tags, names, or the like.

In one aspect, the anomaly service 320 may determine a difference in one or more of the plurality of attributes of a compute resource in the group. In one instance, an agent based technology can extract attributes from one or more hosts or compute resources in order to detect changes (e.g., deltas) in machine configurations between any group of hosts and/or differences in a resource or resource instance within a group over time. More specifically, an agent or software process may be located and executing on the compute resource in order to extract the attributes.

In one example, an additional process may be detected by an agent running on the set of computing instances in the automatically scaled group behand a load balance running of the application server based on one or more differences in related attributes. If an unexpected process is found that is executing on a computing instance, then this evidence may indicate that there are compute resource anomalies which have occurred on a particular computing instance. The unexpected process may be identified by comparison to the processes executing on the other computing instances. Alternatively the unexpected process may be identified by comparing the process list executing on the computing instance to a list of expected processes for the computing instance.

In one aspect, the anomaly service can output an indication of an anomaly that may exist within the group of compute resources. The anomaly detection notification can be an indicator of an anomaly in a compute resource that may be the result of a malicious attack such as malware or an advanced persistent threat (APT). The anomaly service may perform the above described functions periodically and/or in response to one or more events.

Figure 4:
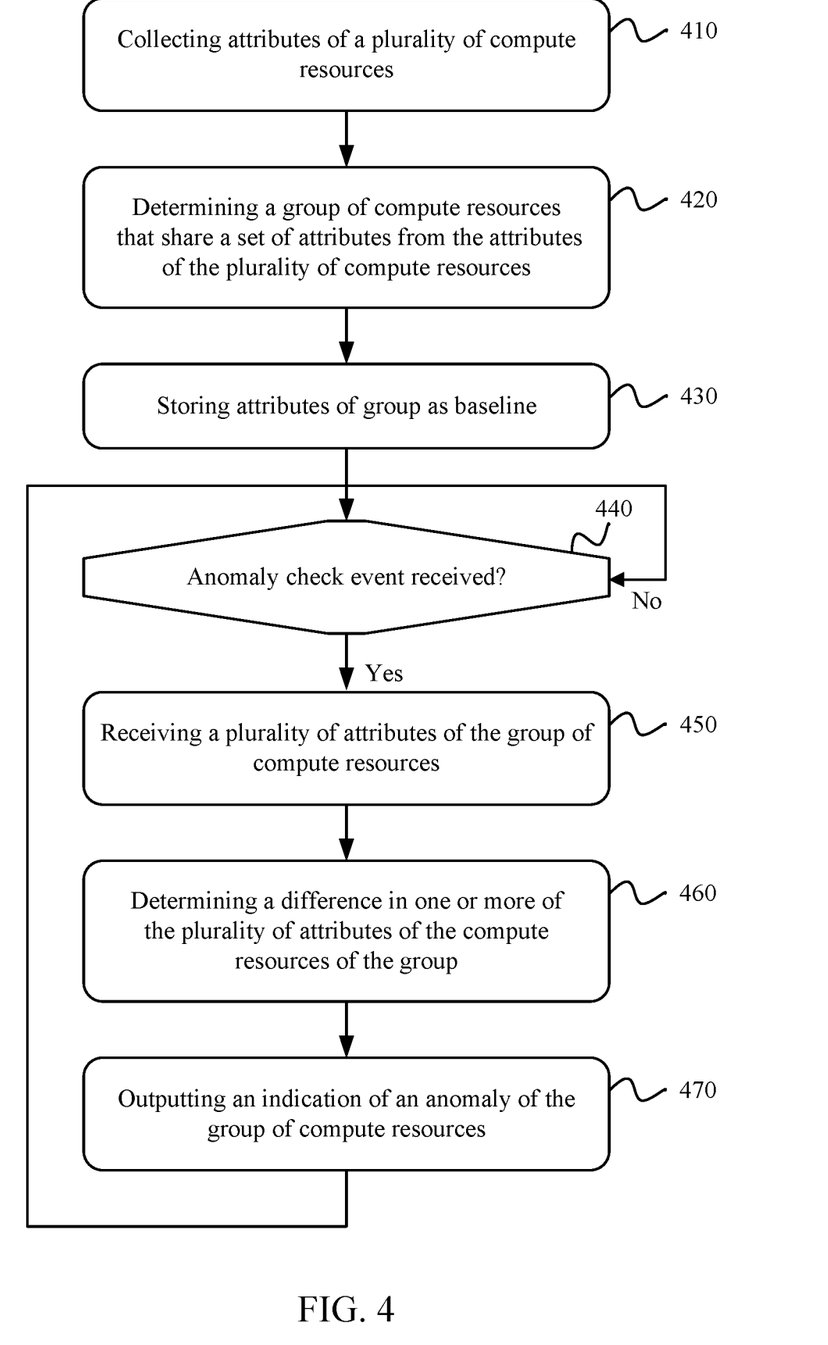
FIG. 4 is a flowchart that illustrates an example method for determining a group of compute resources and computing anomalies in the group of a service provider environment according to an example of the present technology.

FIG. 4 illustrates an example method for determining a group of compute resources and computing anomalies in the group of a service provider environment according to an example of the present technology. The method can be implemented by one or more processors and memory, wherein the memory stores one or more sets of instructions, that, when executed by the one or more processors, perform one or more functionalities including determining a group of compute resources and computing anomalies within the group of compute resources.

As in block 410, attributes of a plurality of compute resources may be collected. In one aspect, the attributes may be configuration and/or operating parameters of compute resource of a service provider environment. In another aspect, the collected attributes may include various configuration parameters from the data plane of the service provider environment and/or operating parameters from the control plane of the service provider environment. For example, the attributes may identify a load balancer, an automatically scaling group, a machine image, a security configuration, MAC addresses, port numbers, or the like.

At block 420, a group of compute resources that share a set of attributes may be determined from the collected attributes of the plurality of compute resources. In one aspect, the computer resources that share the set of attributes may include a plurality of compute resources behind a load balancer, a plurality of automatically scaled compute resources, a plurality of compute resources activated from a common machine image, or a plurality of compute resources activated from a common configuration management operation. In one aspect, determining the group of similar compute resources may include identifying a set of attributes for determining a grouping of compute resources with a predetermined level of confidence. The predetermined level of confidence can be based upon selecting particular attributes that are more likely to indicate that the particular compute resource or computing instance is part of a particular group. For example, attributes that indicate that a resource is a particular type of load balancer or that the resource is coupled to the particular load balancer may identify attributes that belong to a group with a measurable degree of accuracy. In contrast, a Media Access Control (MAC) attribute of a compute resource should be different for each resource and therefore does not indicate whether the compute resource is part of a particular group.

In one aspect, the group may be determined by a function of distance (i.e., measure of similarity or distance function) between two compute resources and a linkage criterion (e.g., quality of collective similarity) for a set of compute resources. The distance, for any two items X and Y, may be specified as a function. According to the function, similar items have small distance and dissimilar items have large distances. A variation of a Hamming distance that counts how many attributes are different and returns the count as the distance may be used. In addition, the function may weight those attributes whose similarities are more or less important for determining the distance. The linkage criterion expands the distance represented by the function to indicate for a given set of items (>2) what is their collective distance. The linkage criterion may use Unweighted Pair Group Method and Arithmetic Mean (UPGMA) which roughly takes the average distance between the pairs of items within the set. For example, a service provider environment may include hosts {V, W, X, Y, Z}. A distance metric can indicate whether X is more similar to Y or more similar to Z (e.g. f(X,Y)<f(X,Z) ?). Whereas the linkage criterion can indicate whether X would be more appropriately clustered with {W, Y} or with {V, Z}. Once the distance and linkage criterion functions are defined, each pair of items can be compared and a distance computed.

At block 430, attributes of the determined group may optionally be stored as a baseline. In one aspect, the attribute values concerning one or more compute resources and/or computing instances of the group at startup may be stored as a baseline.

The processes at 410-430 may be iteratively performed to determining each group of compute resources that share a set of attributes in a service provider environment. In one example, the groupings of compute resources sharing respective sets of attributes may be determined in a hierarchy of groups. For example, computing resources that share a first set of attribute may be determined to be in a first grouping. A subset of computing resources in the first grouping that share a second set of attributes may be determined to be in a second grouping that is a subgroup of the first grouping. In another example, the groupings of compute resources sharing respective sets of attributes may be determined in a set of tiled groups. For example, groups of compute resources sharing common attributes may be determined until all of the compute resources in the service provider environment are placed in a group. In yet another example, the groupings of compute resources sharing respective sets of attributes may be determined in a set of overlapping (e.g., Venn) groups. For example, multiple groups of compute resources that share common attributes may be determined, where the compute resources may be members of two or more groups.

At block 440, it may be determined if an anomaly check event has been received. In one aspect, an anomaly check may be invoked by one or more other computing services, such as an intrusion detection service. In another aspect, the anomaly check event may be based on a predetermined period of time.

At block 450, a plurality of attributes of the group of compute resources may be received if an anomaly check event is received. In one aspect, the attributes for the compute resource of the group may be re-scanned in response to receiving the anomaly check event.

At block 460, a difference in one or more of the plurality of attributes of the compute resources and/or computing instances of the group may be determined. In one aspect, a difference in one or more attributes of a compute resource or computing instance and one or more other compute resources or computing instances in the group may be determined by comparing a corresponding attribute between an instance of the compute resource or computing instance and other compute resources or computing instances in the group. In another aspect, a difference between baseline values and current values of one or more of the plurality of attributes of the compute resources of the group may be determined. In yet another aspect, a difference between expected values and current values of one or more of the plurality of attributes of the compute resources of the group to identify an anomaly in the current values may be determined. In yet a further aspect, a difference from a statistically common value of each of the plurality of attributes of the baseline values may be determined. For example, compute resources in a group may have an attribute that has three possible values. The first and second values are common among the compute resources in the group. Therefore, a compute resource with the third value may be different from the statistically common first and second values and therefore be an indication of a possible anomaly. The statistically common value, may be determined based upon the compute resources of the service provider environment, or upon a group of related service provider environments, or across a diverse network. For example, if an attribute is set to a specific value (N) 98% across 1,000 computing resource then when the value is not N, an anomaly may be indicated. Similarly, standard deviation analysis may be used to analyze values for an attribute and if a value is only one standard deviation away from the mean of a population for a value, then no anomaly may be flagged. If a value is two, three, or more standard deviations away from the mean, then an anomaly may be flagged.

At block 470, an indication of an anomaly of the group of compute resources may be output. In one aspect, the indication may include a list including each computing resource determined to have a difference in one or more of the plurality of attributes and the value of the differing one or more attributes. The processes at blocks 440-470 may be iteratively performed for a plurality of anomaly check events.

Figure 5:
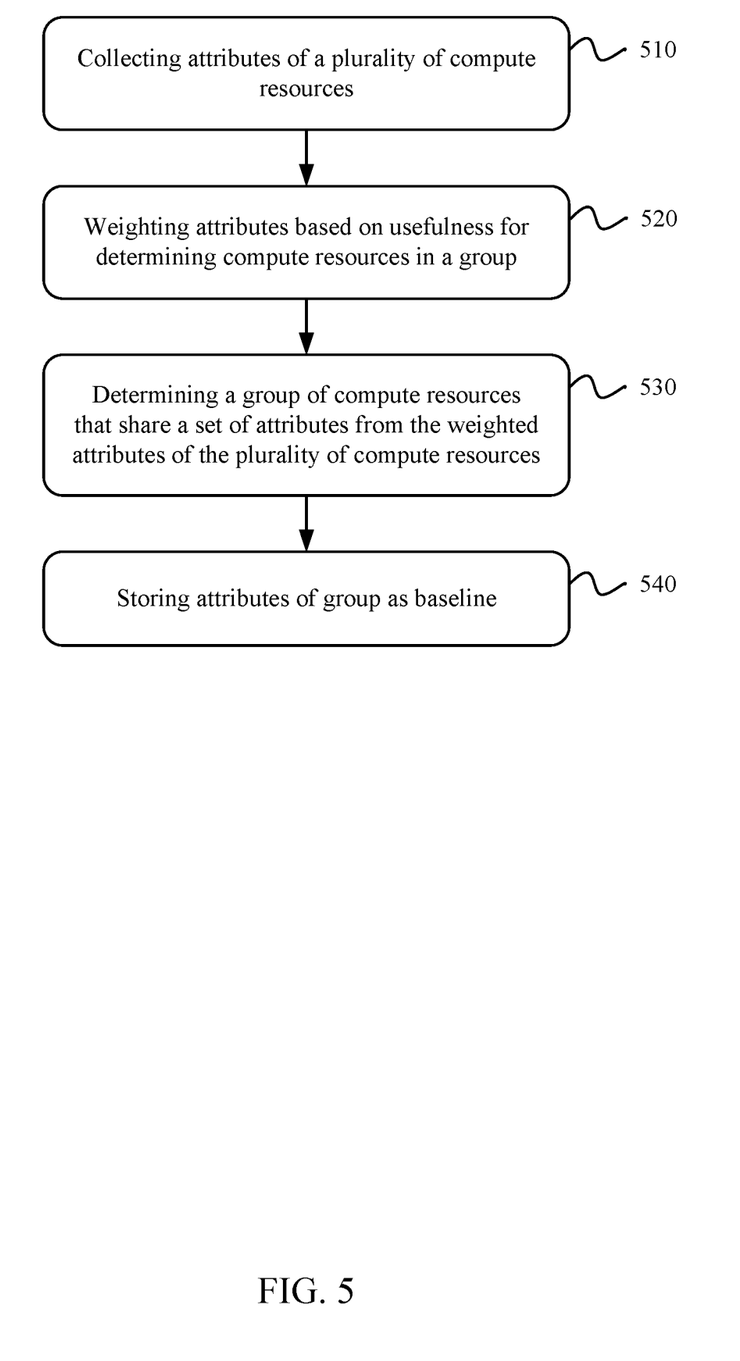
FIG. 5 is a flowchart that illustrates an example method for determining a group of compute resources sharing a set of attributes in a service provider environment according to an example of the present technology.

FIG. 5 illustrates an example method for determining a group of compute resources sharing a set of attributes in a service provider environment according to an example of the present technology. The method can be implemented by one or more processors and memory, wherein the memory stores one or more sets of instructions, that, when executed by the one or more processors, perform one or more functionalities including determining a group of compute resources and a plurality of attributes of the group of compute resources.

As in block 510, attributes of a plurality of compute resources may be collected. The collected attributes may include one or more parameters selected from configuration parameters, event parameters, and execution parameters. In one aspect, the collected attributes may include various configuration parameters from the data plane and/or operating parameters from the control plane of the service provider environment. For example, the attributes may identify a load balancer, an automatic scaling group, a machine image, a security configuration, MAC addresses, port numbers, or the like.

At block 520, the plurality of collected attributes may be weighted based on the usefulness of the attributes for determining compute resources belonging to a group. For example, attributes identifying a load balancer, an automatic scaling group, a machine image, and/or a security configuration may be given a greater weight than MAC and port attributes.

At block 530, a group of compute resources that share a set of attributes is determined from the weighted attributes of the plurality of compute resources. In one aspect, compute resources and/or computing instances that are behind the same load balancer, belong to the same automatic scaling group, and/or invoked from the same machine image may indicate that the resources and or instances belong to a group sharing such attributes. In contrast, compute resources and/or computing instances in the same group may typically have different MAC address, open ports or the like. Therefore, appropriately weighted attributes can improve the identification of compute resources and/or computing instances in the same group.

At block 540, attributes of the determined group may optionally be stored as a baseline. In one aspect, the attribute values concerning one or more compute resources and/or computing instances of the group at startup may be stored as a baseline.

The processes at 510-540 may be iteratively performed to determining each group of compute resources that share a set of attributes in a service provider environment. In one example, the groupings of compute resources sharing respective sets of attributes may be determined in a hierarchy of groups. In another example, the groupings of compute resources sharing respective sets of attributes may be determined in a set of tiled groups. In yet another example, the groupings of compute resources sharing respective sets of attributes may be determined in a set of overlapping (e.g., Venn) groups.

Figure 6:
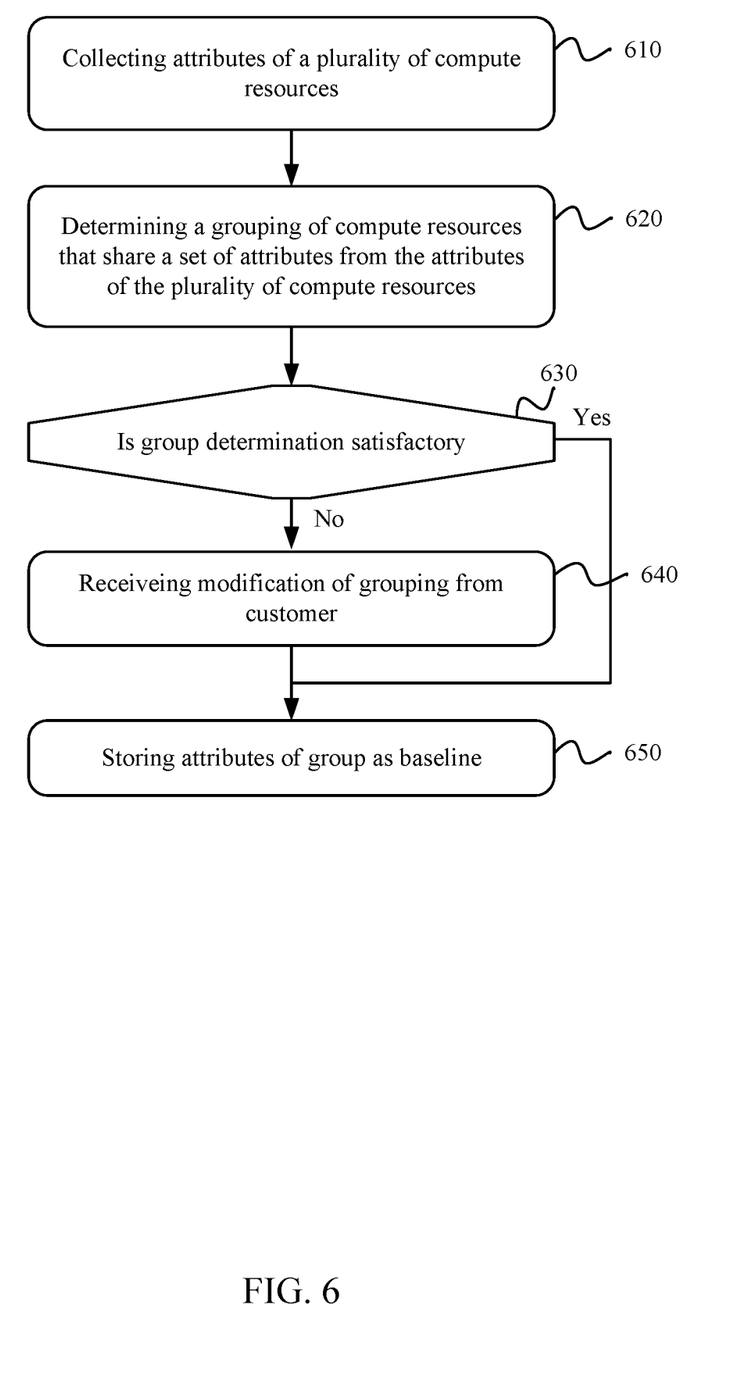
FIG. 6 is a flowchart that illustrates an example method for determining a group of compute resources sharing a set of attributes in a service provider environment according to an example of the present technology.

FIG. 6 illustrates an example method for determining a group of compute resources sharing a set of attributes in a service provider environment according to an example of the present technology. The method can be implemented by one or more processors and memory, wherein the memory stores one or more sets of instructions, that, when executed by the one or more processors, perform one or more functionalities including determining a group of compute resources and a plurality of attributes of the group of compute resources.

As in block 610, attributes of a plurality of compute resources may be collected. The attributes may be configuration and/or operating parameters of compute resource of a service provider environment. In one aspect, the collected attributes may include various configuration parameters from the data plane and/or operating parameters from the control plane of the service provider environment. For example, the attributes may identify a load balancer, an automatic scaling group, a machine image, a security configuration, MAC addresses, port numbers, or the like.

At block 620, a group of compute resources that share a set of attributes may be determined from the collected attributes of the plurality of compute resources. In one aspect, the computer resources that share the set of attributes may include a plurality of compute resources behind a load balancer, a plurality of auto-scaled compute resources, a plurality of compute resources activated from a common machine image, or a plurality of compute resources activated from a common configuration management operation. In one aspect, determining the group of similar compute resources may include identifying a set of attributes for determining a grouping of compute resources with a predetermined level of confidence.

At block 630, it may be determined if the grouping of compute resources is satisfactory. At block 640, if the grouping of compute resources is not satisfactory, a modification of the group of compute resources may be received from a customer. In one aspect, one or more tags may be associated with compute resources and/or computing instance to indicate the group that the computer resource or computing instance belongs to. For example, a use may add a tag attribute via a service endpoint to indicate that a particular computer resource or computing instance belongs to a particular group.

At block 650, attributes of the determined group may optionally be stored as a baseline. In one aspect, the attribute values concerning one or more compute resources and/or computing instances of the group at startup may be stored as a baseline.

The processes at 610-650 may be iteratively performed to determining each group of compute resources that share a set of attributes in a service provider environment. In one example, the groupings of compute resources sharing respective sets of attributes may be determined in a hierarchy of groups. In another example, the groupings of compute resources sharing respective sets of attributes may be determined in a set of tiled groups. In yet another example, the groupings of compute resources sharing respective sets of attributes may be determined in a set of overlapping (e.g., Venn) groups.

Figure 7:
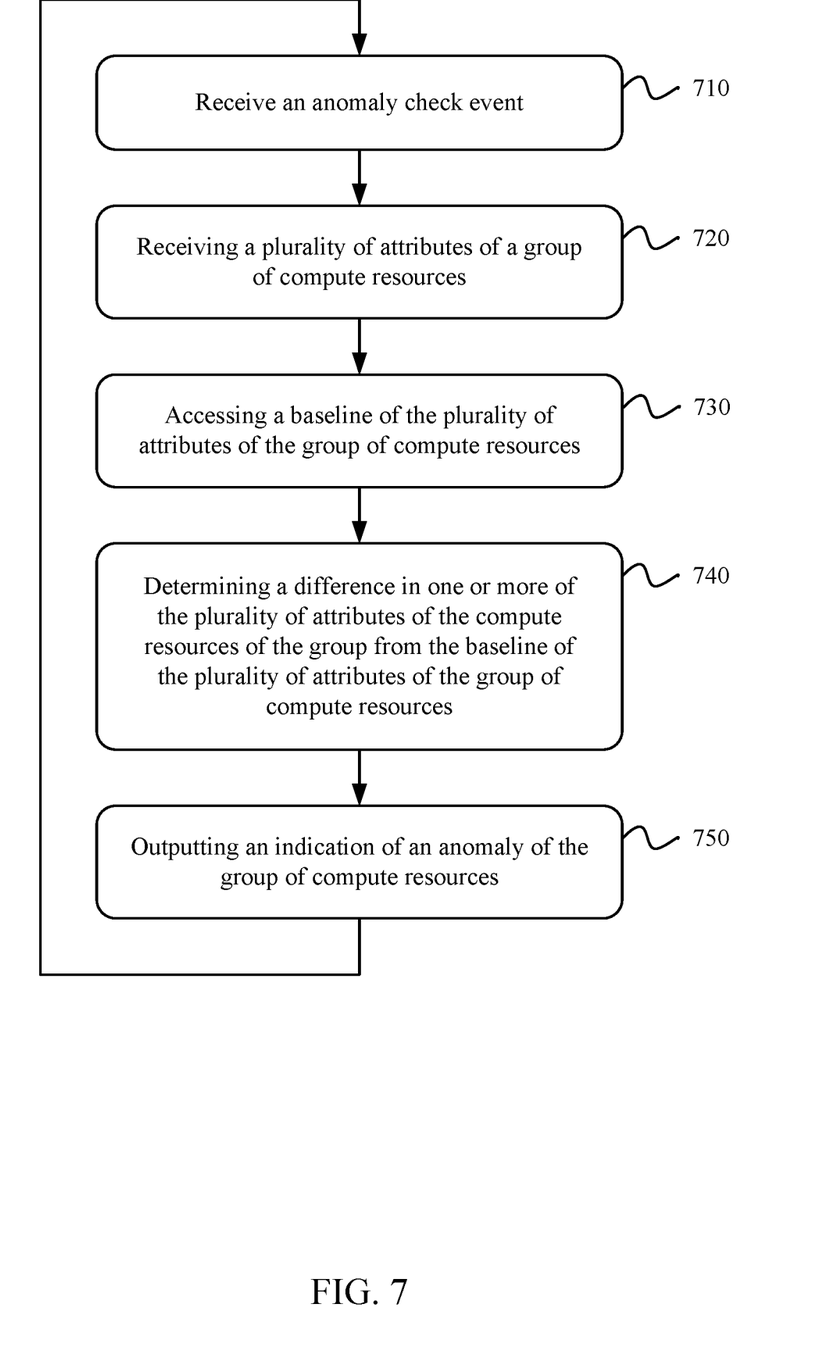
FIG. 7 is a flowchart that illustrates an example method for determining an anomaly in a group of compute resources of a service provider environment according to an example of the present technology.

FIG. 7 illustrates an example method for determining an anomaly in a group of compute resources of a service provider environment according to an example of the present technology. The method can be implemented by one or more processors and memory, wherein the memory stores one or more sets of instructions, that, when executed by the one or more processors, perform one or more functionalities including determining computing anomalies of compute resources in the group.

As in block 710, it may be determined if an anomaly check event has been received. In one aspect, an anomaly check may be invoked by one or more other computing services, such as an intrusion detection service. In another aspect, the anomaly check event may be based on a predetermined period of time.

At block 720, a plurality of attributes of the group of compute resources may be received after an anomaly check event is received. In one aspect, the attributes for the compute resource of the group may be re-scanned in response to receiving the anomaly check event. At block 730, a baseline of the plurality of attributes of the group of compute resources may also be accessed.

At block 740, a difference in one or more of the plurality of attributes of the compute resources of the group from the baseline of the plurality of attributes of the group of compute resources may be determined. At block 750, an indication of an anomaly of the group of compute resources may be output. In one aspect, the indication may include a list including each computing resource determined to have a difference in one or more of the plurality of attributes and the value of the differing attributes. The processes at blocks 710-750 may be iteratively performed for a plurality of anomaly check events.

Figure 8:
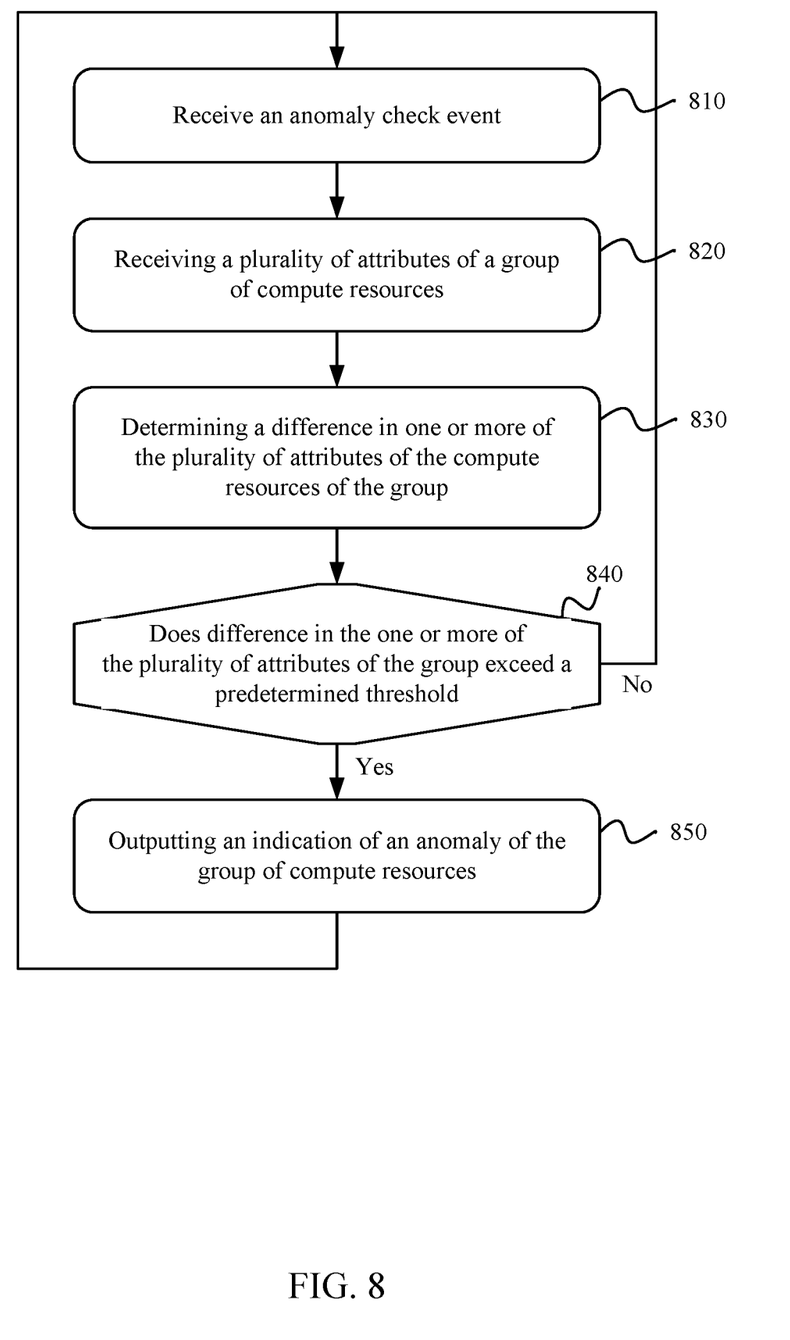
FIG. 8 is a flowchart that illustrates an example method for determining an anomaly in a group of compute resources of a service provider environment according to an example of the present technology.

FIG. 8 illustrates an example method for determining an anomaly in a group of compute resources of a service provider environment according to an example of the present technology. The method can be implemented by one or more processors and memory, wherein the memory stores one or more sets of instructions, that, when executed by the one or more processors, perform one or more functionalities including determining computing anomalies of compute resources in the group.

As in block 810, it may be determined if an anomaly check event has been received. In one aspect, an anomaly check may be invoked by one or more other computing services, such as an intrusion detection service. In another aspect, the anomaly check event may be based on a predetermined period of time, system errors, or some other trigger event.

At block 820, a plurality of attributes of the group of compute resources may be received if an anomaly check event is received. In one aspect, the attributes for the compute resource of the group may be re-scanned in response to receiving the anomaly check event.

At block 830, a difference in one or more of the plurality of attributes of the compute resources of the group may be determined. For example, a difference in one or more attributes of a compute resource or computing instance and one or more other compute resources or computing instances in the group may be determined by comparing a corresponding attribute between an instance of the compute resource or computing instance and other compute resources or computing instances in the group. In another configuration, a difference between baseline values and current values of one or more of the plurality of attributes of the compute resources of the group may be determined. In yet another aspect, a difference between expected values and current values of one or more of the plurality of attributes of the compute resources of the group may be determined to identify an anomaly in the current values. In yet another aspect, a difference from a statistically common value of each of the plurality of attributes of the baseline values may be determined. For example, if the distances is more than a standard deviation or exceeds a mean value for the setting, then this difference may be flagged as a possible problem. The statistically common value, may be determined based upon a group of values for the compute resource of the service provider environment, based upon compute resources across a group of related service provider environments, or across a diverse network.

At block 840, it may be determined if the difference in the one or more of the plurality of attributes exceeds a predetermined threshold. At block 850, if the difference in the one or more of the plurality of attributes exceeds the predetermined threshold an indication of an anomaly of the group of compute resources may be output. The processes at blocks 810-850 may be iteratively performed for a plurality of anomaly check events.

Figure 9:
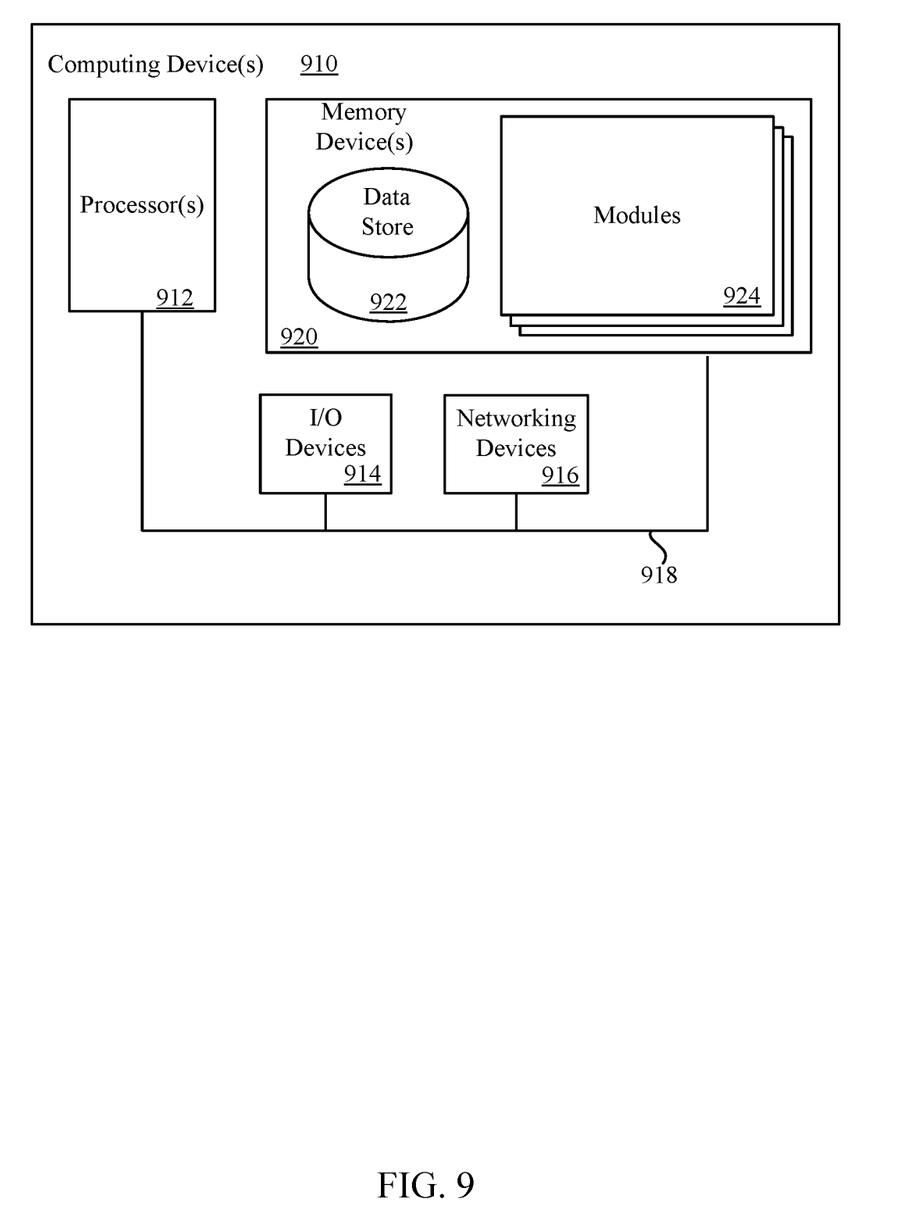
FIG. 9 is a block diagram illustrating a computing device on which modules of this technology may execute.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description may be implemented in the form of software using high programming level languages that are compiled, interpreted or executed using a hybrid of the methods.

The computing device may also have access to I/O (input/output) devices 914 that are usable by the computing devices. Networking devices 916 and similar communication devices may be included in the computing device. The networking devices 916 may be wired or wireless networking devices that connect to the internet, a LAN, WAN, or another computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory device 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

Subscribing compute functions of a compute service to messaging queues of a message queueing service advantageously allows the compute service to be automatically invoked on every message to the queue. Compute service integration with the message queueing service advantageously reduces complexity of message processing code and infrastructure, and improve efficiency and latency.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for anomaly detection in a service provider environment, comprising:
   determining a group of compute resources that share a set of attributes, wherein the compute resources include computing instances each comprising service agents, and the service agents provide attribute data regarding the computing instances that is used to group the compute resources, wherein the determining comprises:

weighting attributes of a set of attributes based on a relevancy of attributes in determining a grouping, wherein the weighting prioritizes a first attribute above a second attribute of the set of attributes based on a relevancy of the first attribute in determining the grouping; and determining the group of compute resources that share the set of attributes based in part on the weighted attributes;

collecting initial attribute values of a plurality of attributes for compute resources in the group;

collecting subsequent attribute values of the plurality of attribute for compute resources in the group;

determining a difference between the plurality of the initial attribute values and the subsequent attribute values of the plurality of attributes of compute resources in the group to identify an anomaly in one of the computing instances; and sending an anomaly detection event notification regarding the one of the computing instances to a client device associated with an administrator.

2. The method of claim 1, wherein the group of compute resources that share the set of attributes further comprises: a plurality of compute resources associated with a load balancer, a plurality of automatically scaled compute resources, a plurality of compute resources activated from a common machine image, or a plurality of compute resources activated from a common configuration management operation.

3. The method of claim 1, wherein the weighting of the attributes is based in part on a social distance.

4. The method of claim 1, wherein the plurality of attributes include one or more parameters selected from configuration parameters, event parameters, and execution parameters.

5. The method of claim 1, wherein the plurality of attributes are received from at least one of a network accessible Application Programming Interface (API) and an agent executing on a customer account.

6. A method, comprising:

identifying a plurality of compute resources in a service provider environment, the compute resources including computing instances that are susceptible to compute resource anomalies, using metadata from the service provider environment, wherein the metadata is provided from service agents associated with each of the compute resources and the metadata is used to identify attribute information for attributes of the computing instances;

weighting attributes of a set of attributes based on relevancy of the attributes;

determining a group of compute resources from the plurality of compute resources, wherein the group of compute resources is determined based at least in part by prioritizing weighted attributes in the weighted set of attributes;

determining a difference in one or more of a plurality of attributes of the compute resources of the group to identify an anomaly in one of the computing instances; and outputting an anomaly detection notification containing the anomaly regarding the one of the computing instances to a client device associated with an administrator.

7. The method of claim 6, wherein determining the group of compute resources comprises:

identifying the set of attributes for determining a grouping of compute resources with a predetermined level of confidence; and selecting the group of similar compute resources from the plurality of compute resources based on the set of attributes.

8. The method of claim 7, wherein the weighting of the attributes is based in part on a social distance.

9. The method of claim 6, wherein determining the difference in one or more of the plurality of attributes of the compute resources of the group comprises:

determining a difference in one or more attributes of a compute resource or computing instance and one or more additional compute resources or computing instances in the group by comparing a corresponding attribute between an instance of the compute resource and instances of the additional compute resources.

10. The method of claim 6, wherein determining the difference in one or more of the plurality of attributes of the compute resources of the group comprises:

determining a difference between initial values and current values of one or more of the plurality of attributes of the compute resources of the group, wherein the initial values were recorded in a time period preceding capture of the current values.

11. The method of claim 6, wherein determining the difference in one or more of the plurality of attributes of the compute resources of the group comprises:

determining a difference between expected values and current values of one or more of the plurality of attributes of the compute resources of the group to identify an anomaly in the current values.

12. The method of claim 6, wherein outputting the anomaly detection notification comprises:

generating a report that lists each computing resource determined to have a difference in one or more of the plurality of attributes and the value of the differing one or more attributes.

13. The method of claim 6, wherein outputting the anomaly detection notification comprises:

triggering an intrusion detection system process.

14. The method of claim 6, wherein outputting the anomaly detection notification comprises:

outputting the anomaly detection notification when the difference between one or more of the plurality of attributes of the compute resources of the group exceeds a predetermined threshold.

15. The method of claim 6, wherein the plurality of attributes include one or more parameters selected from configuration parameters, event parameters, execution parameters and execution patterns.

16. The method of claim 6, wherein the group of similar compute resources includes: one or more host computing instances of an automatic scaling group, one or more host computing instances from a machine image, or one or more host computing instances from a configuration management operation.

17. The method of claim 6, wherein determining the difference in one or more of the plurality of attributes of the compute resources of the group comprises:

collecting baseline attribute values of the plurality of attributes for each compute resource in the group;

receiving an anomaly detection trigger event;

collecting updated attribute values of the plurality of attributes for the compute resources in the group; and determining for the compute resources of the group whether at least one updated attribute value differs from a corresponding baseline attribute value of a respective one of the plurality of attributes.

18. A method for anomaly detection in a service provider environment, comprising:
   determining a group of compute resources that share a set of attributes, wherein the compute resources include computing instances each comprising service agents, and the service agents provide attribute data regarding the computing instances that is used to group the compute resources, wherein the determining comprises:
      weighting attributes of a set of attributes based on a relevancy of attributes in determining a grouping, wherein the weighting prioritizes a first attribute above a second attribute of the set of attributes based on a relevancy of the first attribute in determining the grouping; and
      determining the group of compute resources that share the set of attributes based in part on the weighted attributes;
   collecting initial attribute values of a plurality of attributes for compute resources in the group;
   collecting subsequent attribute values of the plurality of attribute for compute resources in the group;
   determining a difference between the plurality of the initial attribute values and the subsequent attribute values of the plurality of attributes of compute resources in the group;
   detecting an anomaly based on the difference to identify an anomaly in one of the computing instances; and
   triggering a remediation action based in part on detecting the anomaly, in order to mitigate the anomaly in the one of the computing instances.

19. The method of claim 18, wherein the remediation action is triggered once the difference exceeds a predetermined threshold.

20. The method of claim 18, wherein the group of compute resources that share the set of attributes further comprises: a plurality of compute resources associated with a load balancer, a plurality of automatically scaled compute resources, a plurality of compute resources activated from a common machine image, or a plurality of compute resources activated from a common configuration management operation.

* * * * *